United States Patent
Park et al.

(10) Patent No.: US 9,904,108 B2
(45) Date of Patent: Feb. 27, 2018

(54) LIQUID CRYSTAL DISPLAY WITH MULTIPLE DISPLAY AREAS

(71) Applicant: LG Display Co., Ltd., Seoul (KR)

(72) Inventors: Kyungjae Park, Incheon (KR); Jeil Ryu, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/162,118

(22) Filed: May 23, 2016

(65) Prior Publication Data

US 2016/0349439 A1   Dec. 1, 2016

(30) Foreign Application Priority Data

May 26, 2015 (KR) .................. 10-2015-0072936

(51) Int. Cl.
*G02F 1/1335* (2006.01)
*F21V 8/00* (2006.01)

(52) U.S. Cl.
CPC ..... *G02F 1/133615* (2013.01); *G02B 6/0036* (2013.01); *G02B 6/0053* (2013.01); *G02B 6/003* (2013.01); *G02B 6/0021* (2013.01); *G02B 6/0068* (2013.01)

(58) Field of Classification Search
CPC ........... G02F 1/13336; G02F 1/133615; G02B 6/0053
See application file for complete search history.

(56) References Cited

U.S. PATENT DOCUMENTS

| 8,118,466 B2* | 2/2012 | Cho .................. G02F 1/133308 349/65 |
| 8,885,117 B2* | 11/2014 | Song ..................... G02F 1/1323 349/16 |
| 9,305,505 B1* | 4/2016 | Seen ..................... G02B 6/0068 |
| 2006/0209230 A1* | 9/2006 | Liao .................. G02F 1/133615 349/65 |
| 2009/0129049 A1 | 5/2009 | Lee et al. |
| 2012/0224122 A1 | 9/2012 | Koganezawa |

FOREIGN PATENT DOCUMENTS

| CN | 104346097 A | 2/2015 |
| JP | H05-323344 A | 12/1993 |
| JP | 2002-014366 A | 1/2002 |
| JP | 2009-054454 A | 3/2009 |

(Continued)

OTHER PUBLICATIONS

Taiwan Office Action, Taiwan Application No. 105116250, dated Nov. 15, 2016, 18 pages.

(Continued)

*Primary Examiner* — Dung Nguyen
(74) *Attorney, Agent, or Firm* — Fenwick & West LLP

(57) ABSTRACT

A liquid crystal display comprises a liquid crystal panel and a backlight unit. The liquid crystal panel includes a main display area and a sub-display area protruding from the main display area. The backlight unit includes a light guide plate having a main light plate below the main display area and a sub-display light plate below the sub-display area. A first light source emits first light primarily into the main light plate below the main display area and a second light source emits second light primarily into the sub-display light plate below the sub-display area.

22 Claims, 13 Drawing Sheets

(56) References Cited

FOREIGN PATENT DOCUMENTS

| | | |
|---|---|---|
| TW | 200408875 A | 6/2004 |
| TW | I292838 | 1/2008 |
| TW | 201305688 A | 2/2013 |
| TW | 201326983 A | 7/2013 |
| WO | WO 2014/174885 A1 | 10/2014 |

OTHER PUBLICATIONS

Taiwan Office Action, Taiwan Application No. 105116250, dated Jun. 20, 2017, 18 pages.
Taiwan Office Action, Taiwan Application No. 105116250, dated Oct. 26, 2017, 17 pages.

* cited by examiner

Fig. 3
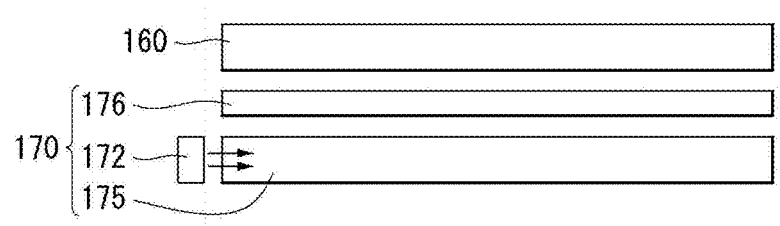
Fig. 4
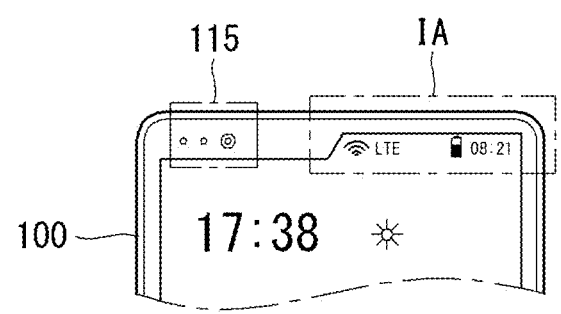
(a)
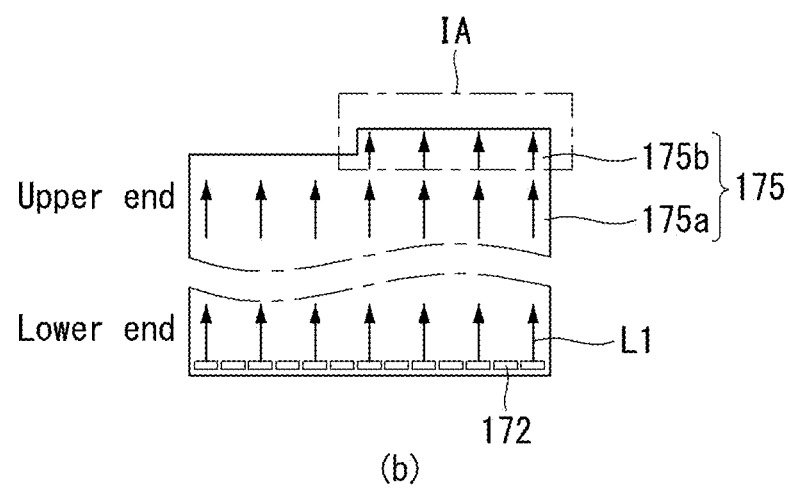
(b)

Fig. 5
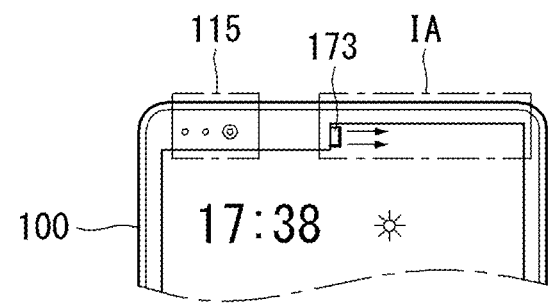
(a)
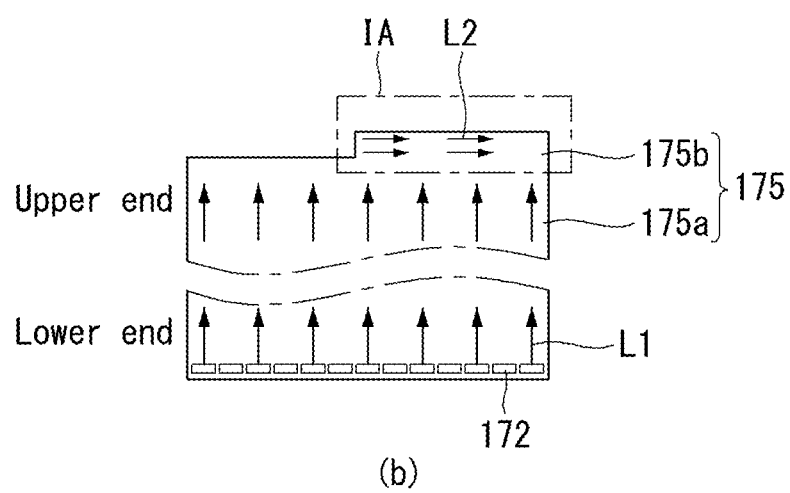
(b)

Fig. 12
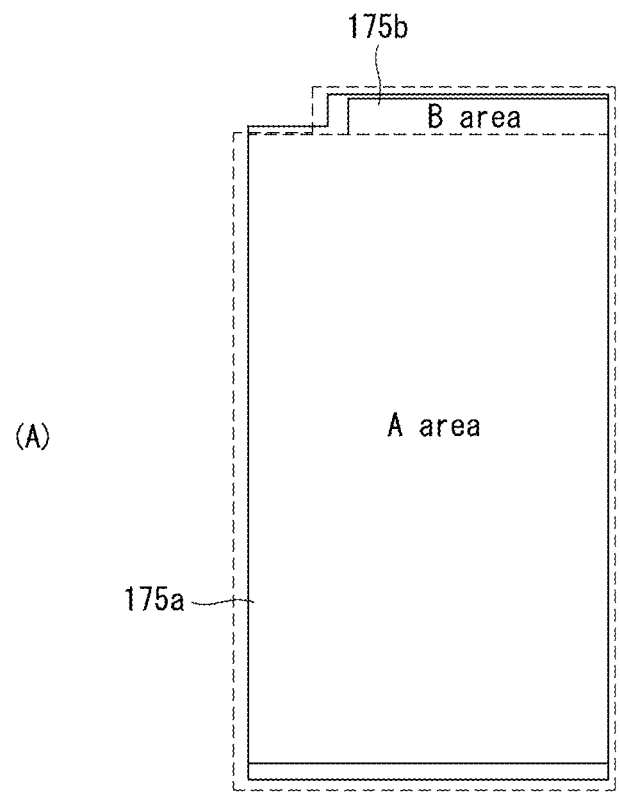
(A)
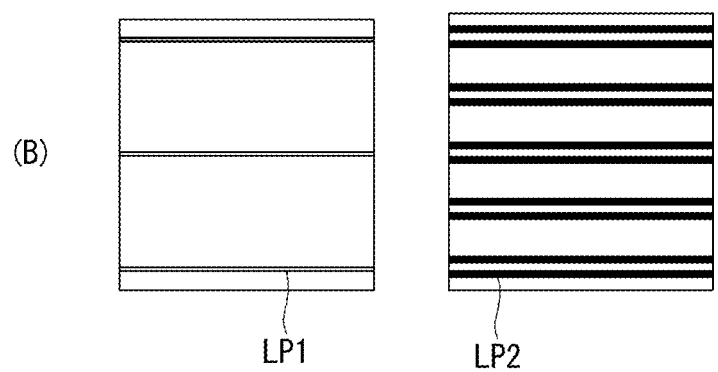
(B)

Fig. 13
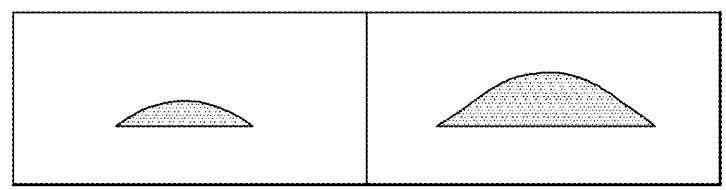
(A)
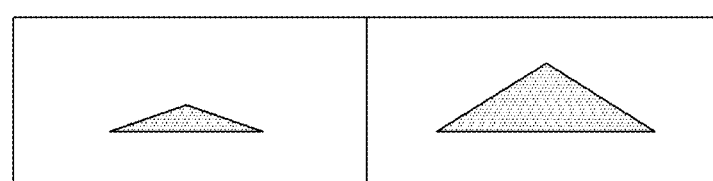
(B)

LIQUID CRYSTAL DISPLAY WITH MULTIPLE DISPLAY AREAS

This application claims the benefit of Korean Patent Application No. 10-2015-0072936, filed on May 26, 2015, which is hereby incorporated by reference for all purposes as if fully set forth herein.

BACKGROUND

Field

This document relates to a liquid crystal display with multiple display areas.

Related Art

With the development of information technology, the market for display devices as connecting media between users and information) is growing. In line with this trend, display devices, such as liquid crystal displays (LCDs), organic light emitting displays (OLEDs), plasma display panels (PDPs), etc., are increasingly used. Among them, liquid crystal displays are widely used because they have high resolution and can be both large and small in size.

A liquid crystal display comprises a liquid crystal panel and a backlight unit. The liquid crystal panel comprises a liquid crystal layer disposed between a transistor substrate where thin film transistors, storage capacitors, and pixel electrodes are formed and a color filter substrate where color filters, a black matrix, etc. are formed.

The backlight unit comprises a light source substrate where light sources (e.g., light-emitting diodes (LEDs)) for providing light to the liquid crystal panel and a light source driver for driving the light sources are formed, a light guide plate for turning the light emitted from the light sources into a surface light source, a reflector for reflecting the light from the light guide plate, an optical sheet for collecting and diffusing the light emitted from the light guide plate, etc.

The above-explained liquid crystal display is used in the implementation of a wide range of devices including televisions, smartphones, smart watches, etc. Conventionally, liquid crystal panels were made in a square (or rectangular) shape, while there is ongoing research and development into manufacturing liquid crystal panels of various shapes other than the traditional squares. However, there could be a lot of issues with the backlight unit and the liquid crystal panel that can occur in making liquid crystal panels into shapes other than squares. There is a need to study and resolve these issues.

SUMMARY

A liquid crystal display comprises a liquid crystal panel and a backlight unit. The liquid crystal panel includes a main display area and a first sub-display area protruding from the main display area. The backlight unit includes a light guide plate, a first light source, and a second light source. The light guide plate includes a main light plate below the main display area and a first sub-display light plate below the first sub-display area. The light guide plate guides light to the liquid crystal panel. The first light source emits first light primarily into the main light plate below the main display area. The second light source emits second light primarily into the first sub-display light plate below the first sub-display area.

In an embodiment, a light source control circuit controls the first light source and the second light source, such that in a first operation mode the second light source is on and the first light source is off, and in a second operation mode both the first and second light sources are on.

Furthermore, in an embodiment, the first light source is configured to emit the first light primarily in a first direction, and the second light source is configured to emit second light primarily in a second direction different than the first direction.

In a second embodiment, a liquid crystal display comprises a liquid crystal panel and a backlight unit. The liquid crystal panel includes a main display area and a first sub-display area protruding from the main display area. The backlight unit includes a light guide plate, a first light source, and a second light source. The light guide plate includes a main light plate below the main display area and a first sub-display light plate below the first sub-display area. The light guide plate guides light to the liquid crystal panel. The first light source emits first light and is disposed in the main display area. The second light source emits second light and is disposed in the sub-display area.

BRIEF DESCRIPTION OF THE DRAWINGS

The accompanying drawings, which are included to provide a further understanding of the invention and are incorporated on and constitute a part of this specification illustrate embodiments of the invention and together with the description serve to explain the principles of the invention.

FIG. 3 is a cross-sectional view schematically showing a liquid crystal panel and a backlight unit;

FIG. 4 is a view schematically showing a smartphone implemented according to a test example and part of the backlight unit included in it;

FIG. 5 is a view schematically showing a smartphone implemented according to a first exemplary embodiment and part of the backlight unit included in it;

FIGS. 11 to 15 are views illustrating a solution to the luminance non-uniformity occurring when only the light sources placed in a protruding area emit light.

DETAILED DESCRIPTION

Reference will now be made in detail to embodiments of the invention, examples of which are illustrated in the accompanying drawings.

Hereinafter, a specific exemplary embodiment of the present invention will be described in detail with reference to the attached drawings.

Figure 1:
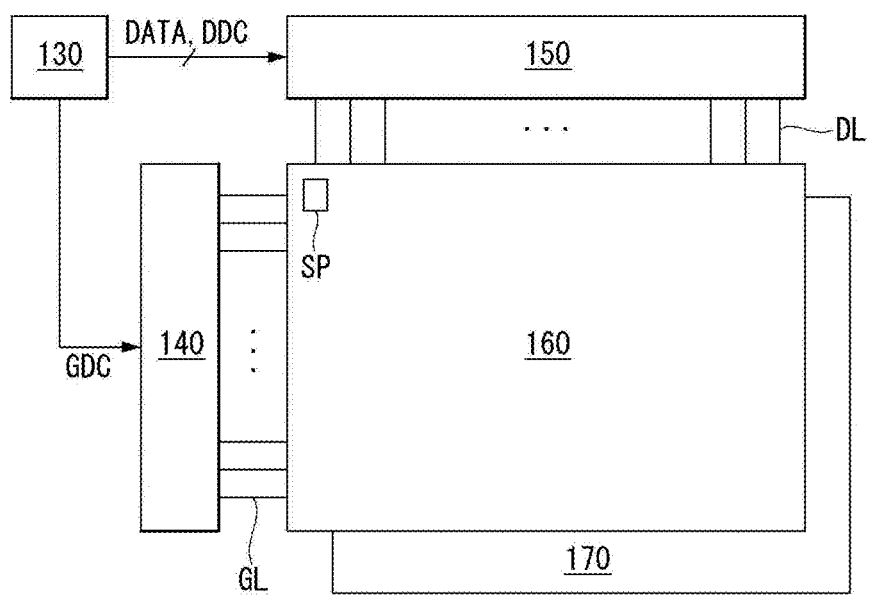
FIG. 1 is a block diagram schematically showing a liquid crystal display.
Figure 2:
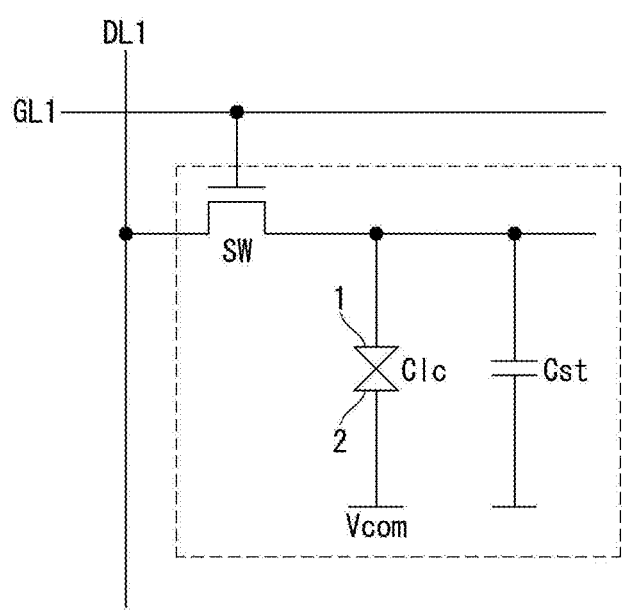
FIG. 2 is a circuit diagram schematically showing the subpixel of FIG. 1.

FIG. 1 is a block diagram schematically showing a liquid crystal display. FIG. 2 is a circuit diagram schematically showing the subpixel of FIG. 1. FIG. 3 is a cross-sectional view schematically showing a liquid crystal panel and a backlight unit;

As illustrated in FIGS. 1 to 3, the liquid crystal display comprises a timing controller 130, a gate driver 140, a data driver 150, a liquid crystal panel 160, and a backlight unit 170.

The timing controller 130 outputs a gate timing control signal GDC for controlling the timing of operation of the gate driver 140 and a data timing control signal DDC for controlling the timing of operation of the data driver 150. The timing controller 130 supplies a data signal DATA supplied from an image processor 110, along with the data timing control signal DDC, to the data driver 150.

In response to the gate timing control signal GDC supplied from the timing controller 130, the gate driver 140 outputs a gate signal while shifting the level of a gate voltage. The gate driver 140 supplies the gate signal to subpixels SP included in the liquid crystal panel 160. The gate driver 140 may be formed in the form of an IC (integrated circuit) or as a gate-in panel on the liquid crystal panel 160.

In response to the data timing control signal DDC supplied from the timing controller 130, the data driver 150 samples and latches the data signal DATA, and converts it into a gamma reference voltage and outputs it. The data driver 150 supplies the data signal DATA to the subpixels SP included in the liquid crystal panel 160 through data lines DL. The data driver 150 is formed in the form of an IC (integrated circuit).

The liquid crystal panel 160 displays an image in response to the gate signal supplied from the gate driver 140 and the data signal DATA supplied from the data driver 150. The liquid crystal panel 160 comprises the subpixels SP that control the light provided by the backlight unit 170.

One subpixel comprises a switching transistor SW, a storage capacitor Cst, and a liquid crystal layer Clc. A gate electrode of the switching transistor SW is connected to a gate line GL1, and a source electrode thereof is connected to a data line DL1. One end of the storage capacitor Cst is connected to a drain electrode of the switching transistor SW, and the other end is connected to a common voltage line Vcom. The liquid crystal layer Clc is formed between a pixel electrode 1 connected to the drain electrode of the switching transistor SW and a common electrode 2 connected to the common voltage line Vcom.

The liquid crystal panel 160 is implemented in TN (Twisted Nematic) mode, VA (Vertical Alignment) mode, IPS (In-Plane Switching) mode, FFS (Fringe Field Switching) mode, or ECB (Electrically Controlled Birefringence) mode.

The backlight unit 170 provides light to the liquid crystal panel 160 by using a light source, etc. that emits light. The backlight unit 170 comprises first light sources (e.g., light-emitting diodes (LEDs)) 172 that emit light, a light source driver that drives the first light sources 172, a first light source substrate where the first light sources 172 are built, a light guide plate 175 that converts the light emitted from the first light sources 172 into a surface light source, a reflector that reflects the light from the light guide plate, an optical sheet 176 that collects and diffuses the light emitted from the light guide plate 175, etc. The liquid crystal panel 160 and the backlight unit 170 are held between a top cover (guide panel, etc.) and a bottom cover (cover bottom, etc.) and manufactured in the form of a liquid crystal panel module.

The above-explained liquid crystal display is used in the implementation of a wide range of devices including televisions, smartphones, smart watches, etc. Conventionally, liquid crystal panels were made in a square (or rectangular) shape, while there is ongoing research and development into manufacturing liquid crystal panels of various shapes other than the traditional squares. However, issues may arise with the backlight unit and the liquid crystal panel that can occur in making liquid crystal panels into shapes other than squares. There is a need to study and resolve these issues.

In the following, the liquid crystal display is implemented on a smartphone, with a protruding area on one side of the liquid crystal panel that protrudes further than the other sides. Also, the exemplary embodiment will be described with an example by which the issues with the backlight unit and the liquid crystal panel, occurring when the protruding area is used as an extra indicator area, can be studied and resolved.

Because the protruding area horizontally protrudes (or extends) on one side of the liquid crystal panel and displays a different image or information from that displayed in a display area, it can be defined as a sub display area. For example, in one embodiment, the main display area comprises a first plurality of rows of pixels each have a same first length to form a rectangular main display area, and the sub display area comprises a second plurality of rows of pixels each having a respective length shorter than the first length. The addition of the sub display area to the liquid crystal panel increases the surface area of the display. Thus, if the liquid crystal display is implemented on a smartphone, etc., its additional information display feature or the like may be enhanced. The following description will be given with an example in which the protruding area is provided on the top side of the liquid crystal panel, but it also may be provided on one or more of the left, right, and bottom sides. Also, it should be noted that, while the following description will be given with an example in which the liquid crystal display is implemented on a smartphone, the present invention also may be applicable to portable devices such as tablets, or to display devices in which the liquid crystal panel's display surface is polygonal (or irregular), rather than square.

Figure 6:
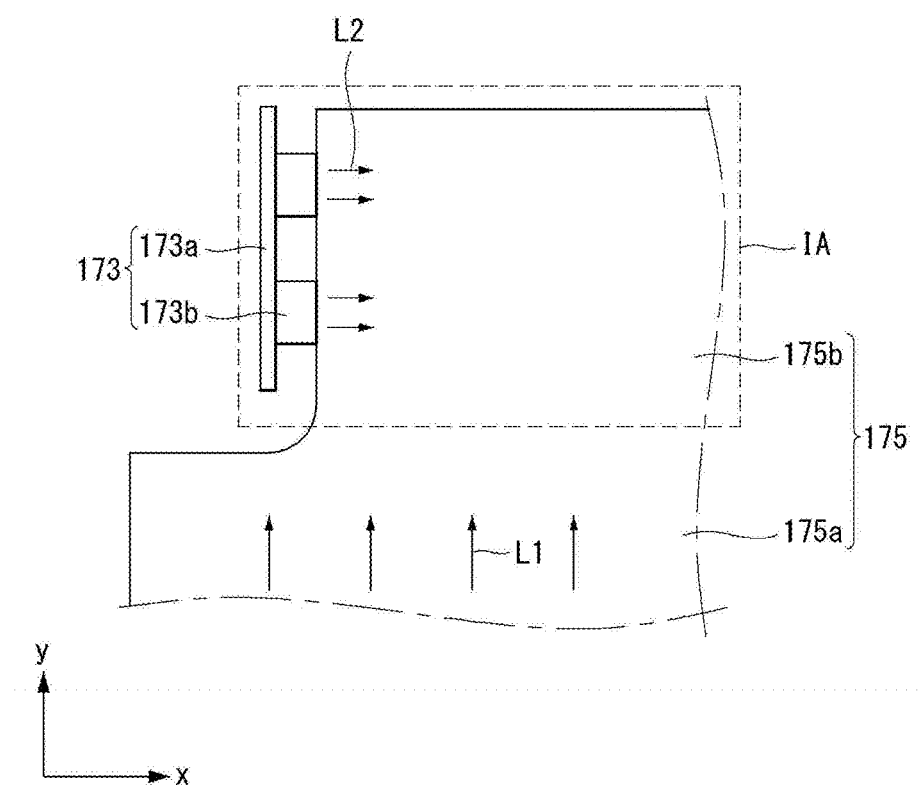
FIG. 6 is a top plan view schematically showing part of the backlight unit according to the first exemplary embodiment.

FIG. 4 is a view schematically showing a smartphone implemented according to a test example and part of the backlight unit included in it. FIG. 5 is a view schematically showing a smartphone implemented according to a first exemplary embodiment and part of the backlight unit included in it. FIG. 6 is a top plan view schematically showing part of the backlight unit according to the first exemplary embodiment.

As illustrated in (a) of FIG. 4, in the test example, a protruding area IA is provided on the right top side of the liquid crystal panel, and a smartphone 100 is implemented using the protruding area IA. The protruding area IA shows base station's reception status, battery charging status (or remaining usage time), etc. An external module area 115 with a camera or illumination sensor is located on the left side, adjacent to the protruding area IA.

The smartphone 100 according to the test example shows current time, applications specified by the user, etc. in the display area, and shows base station's reception status, battery charging status, etc. in the protruding area IA. The smartphone 100 according to the test example is implemented in a way that drives the display area and the protruding area IA to display information or in a way that selectively drives either the display area or the protruding area IA to display information.

As illustrated in (b) of FIG. 4, when both the display area and protruding area IA of the smartphone 100 according to the test example are driven, all the first light sources 172 located at the lower end of the smartphone 100 emit light. Accordingly, the light emitted from the first light sources 172 travels in a first direction L1 along a main light plate (A area) (first area corresponding to the display area) 175a of the light guide plate 175, and is transmitted to the upper end from the lower end. Light reaching the upper end is transmitted to a sub-display light plate (B area) (second area corresponding to the protruding area) of the light guide plate 175. In contrast, when only the protruding area IA is driven, only part of the first light sources 172 (LEDs corresponding to the protruding area) located at the lower end of the smartphone 100 emits light.

First Exemplary Embodiment

As illustrated in (a) of FIG. 5 and FIG. 6, in the first exemplary embodiment, a protruding area IA is provided on the right top side of the liquid crystal panel, and a smartphone 100 is implemented using the protruding area IA. As is the case with the test example, the protruding area IA shows base station's reception status, battery charging status (or remaining usage time), etc. An external module area 115 with a camera or illumination sensor is located on the left side, adjacent to the protruding area IA.

The smartphone 100 according to the first exemplary embodiment, too, shows current time, applications specified by the user, etc. in the display area, and shows base station's reception status, battery charging status, etc. in the protruding area IA. The smartphone 100 according to the first exemplary embodiment is implemented in a way that drives the display area and the protruding area IA to display information or in a way that selectively drives either the display area or the protruding area IA to display information. However, unlike the display area, the protruding area IA may be implemented in a way that keeps displaying information (i.e., continues to emit light).

In order to minimize the usage of light sources on the smartphone 100 according to the first exemplary embodiment, based on the test results obtained from the test example, second light sources 173 (otherwise referred to as sub LEDs), in addition to the first light sources 172 (otherwise referred to as main LEDs), are placed adjacent to the protruding area IA. For example, in one embodiment, the protruding area IA has a long edge and a short edge, and the second light sources 173 are positioned adjacent to the short edge. Unlike the first light sources 172, the second light sources 173 emit light in a second direction L2.

That is, the second light sources 173 are placed on the left side of the protruding area IA on the right. With respect to the light guide plate 175, the second light sources 173 may be described as being placed in a space on the left side of the B area 175b. In the drawing, a first direction L1 corresponds to a vertical direction (upward), and the second direction L2 corresponds to a horizontal direction (leftward).

As illustrated in (b) of FIG. 5 and FIG. 6, when both the display area and protruding area IA of the smartphone 100 according to the first exemplary embodiment are driven, the first light sources 172 located at the lower end of the smartphone 100 and the second light sources 173 located adjacent to the protruding area IA both emit light. Accordingly, the light emitted from the first light sources 172 travels primarily in the first direction L1 along an area A (display area) 175a of the light guide plate 175, and is transmitted to the upper end from the lower end. The light emitted from the second light sources 173 travels primarily in the second direction L2 along a B area (protruding area) 175b of the light guide plate 175. For example, the second direction L2 may be substantially perpendicular to the first direction L1. In one embodiment, the second direction L2 is within a predefined tolerance of perpendicular to the first direction such as, for example, within 5 degrees of perpendicular, within 10 degrees, or within 20 degrees. In contrast, when only the protruding area IA is driven, only the second light sources 173, which are adjacent to the protruding area IA, emit light. That is, the first light sources 172 emit no light (turn-off) when only the protruding area IA is driven.

As can be seen from above, the smartphone 100 according to the first exemplary embodiment has lower power consumption compared to the test example, because only the second light sources 173, which are adjacent to the protruding area IA, are required to emit light when displaying information by driving only the protruding area IA.

The number of second light sources 173 is determined according to the area or size of the B area (protruding area) 175b. While the first exemplary embodiment uses, for example, two second light sources 173, I second light sources (I is an integer equal to or greater than 1) also may be used.

In an embodiment, a light source control circuit may separately control the first light sources 172 and the second light sources 173. For example, in a first operation mode, the second light source 173 is on and the first light source 172 is off such that only the sub display area is active. In a second operation mode, both the first light source 172 and the second light source 173 are on. Thus, in an embodiment, the sub display area operates as an "always on" display.

Other exemplary embodiments will be described below.

Second Exemplary Embodiment

Figure 7:
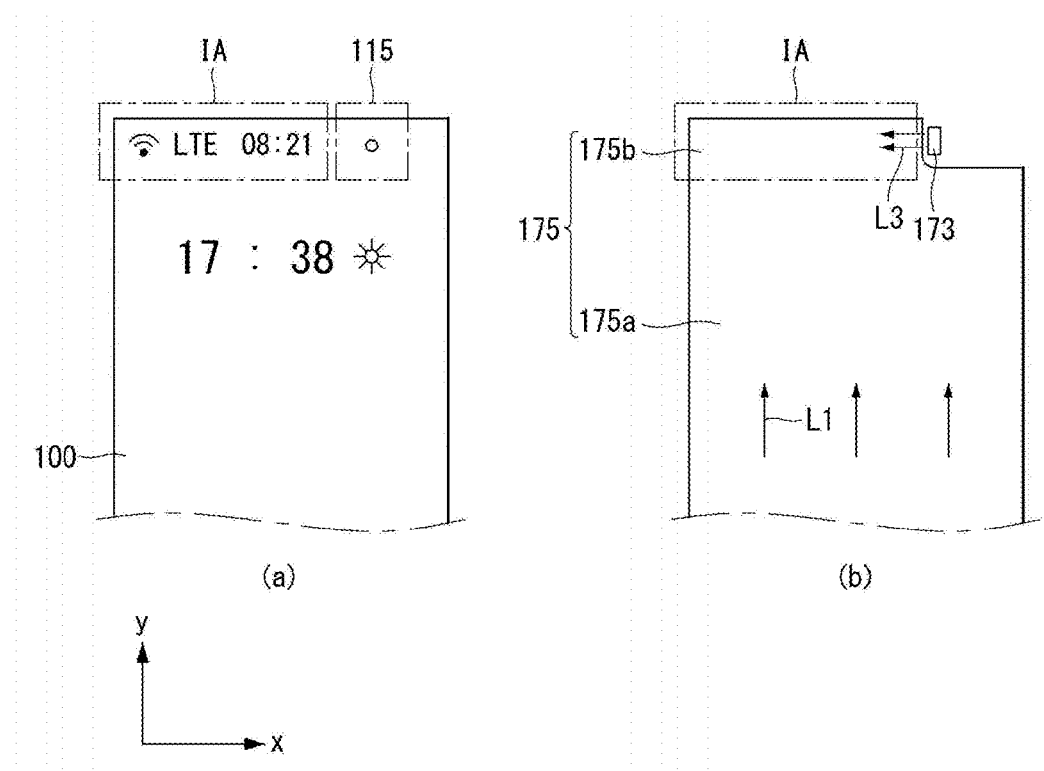
FIG. 7 is a view schematically showing a smartphone implemented according to a second exemplary embodiment and part of the backlight unit included in it.
Figure 8:
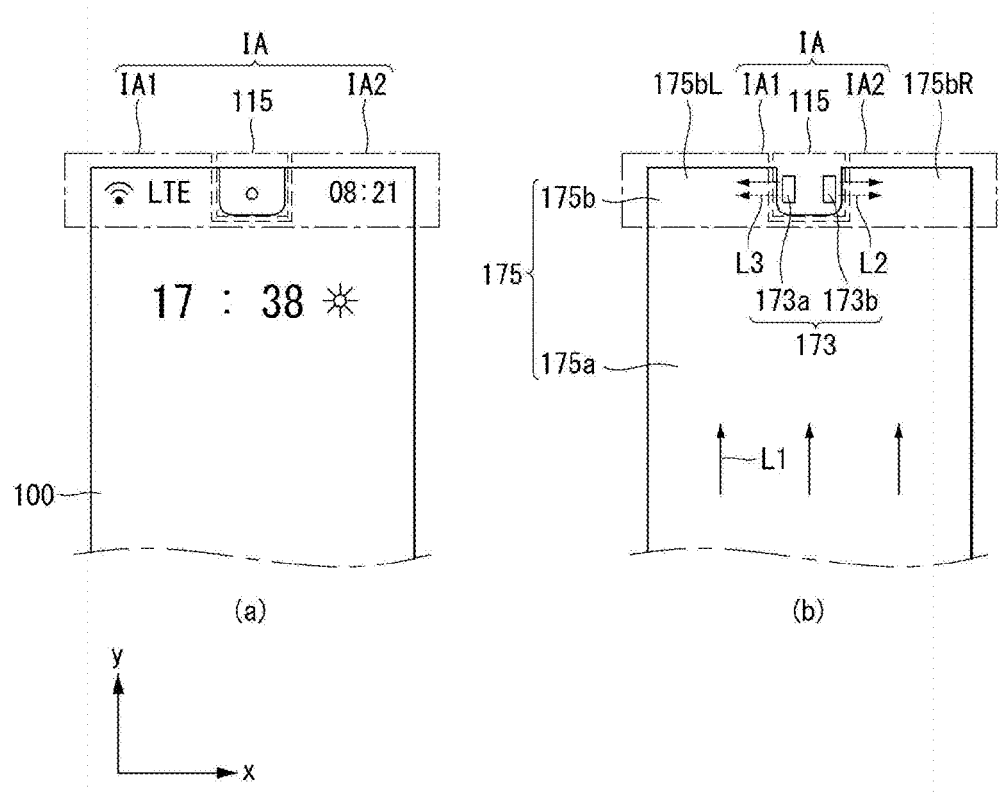
FIG. 8 is a view schematically showing a smartphone implemented according to a third exemplary embodiment and part of the backlight unit included in it.
Figure 9:
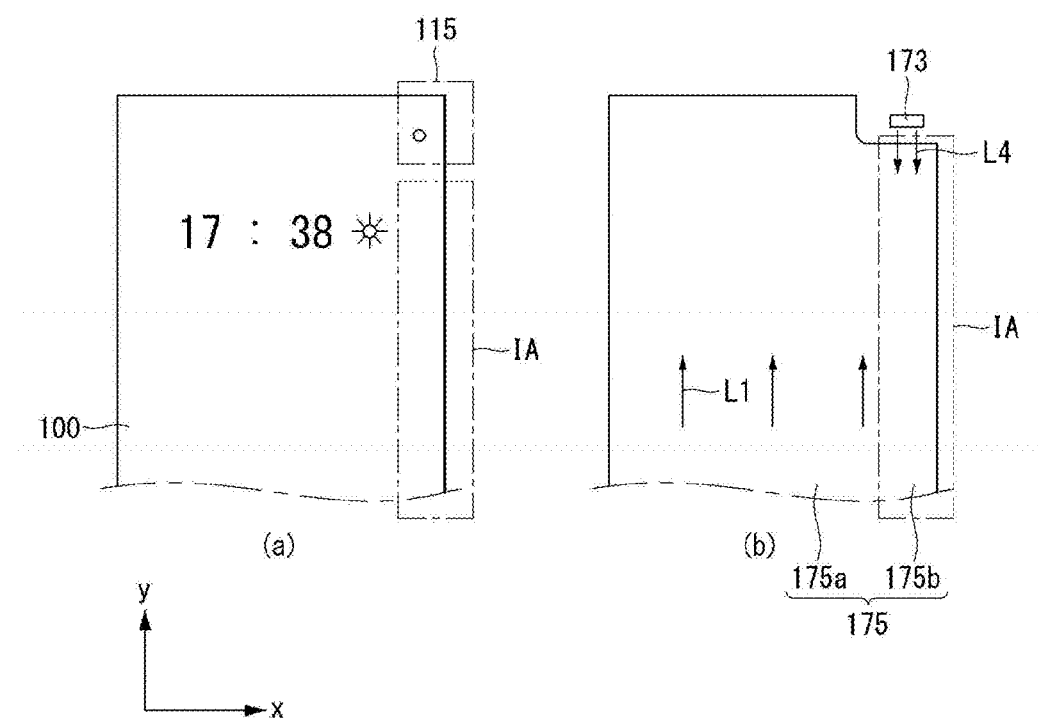
FIG. 9 is a view schematically showing a smartphone implemented according to a fourth exemplary embodiment and part of the backlight unit included in it.

FIG. 7 is a view schematically showing a smartphone implemented according to a second exemplary embodiment and part of the backlight unit included in it. FIG. 8 is a view schematically showing a smartphone implemented according to a third exemplary embodiment and part of the backlight unit included in it. FIG. 9 is a view schematically showing a smartphone implemented according to a fourth exemplary embodiment and part of the backlight unit included in it.

As illustrated in (a) of FIG. 7, in the second exemplary embodiment, a protruding area IA is provided on the left top side of the liquid crystal panel, and a smartphone 100 is implemented using the protruding area IA. As is the case with the test example, the protruding area IA shows base station's reception status, battery charging status (or remaining usage time), etc. An external module area 115 with a camera or illumination sensor is located on the right side, adjacent to the protruding area IA.

The smartphone 100 according to the second exemplary embodiment, too, shows current time, applications specified by the user, etc. in the display area, and shows base station's reception status, battery charging status, etc. in the protruding area IA. The smartphone 100 according to the second exemplary embodiment is implemented in a way that drives the display area and the protruding area IA to display information or in a way that selectively drives either the display area or the protruding area IA to display information.

In order to minimize the usage of light sources on the smartphone 100 according to the second exemplary embodiment, based on the test results obtained from the test example, second light sources 173 (otherwise referred to as sub LEDs), in addition to the first light sources 172 (otherwise referred to as main LEDs), are placed adjacent to the protruding area IA. Unlike the first light sources 172, the second light sources 173 emit light in a third direction L3.

That is, the second light sources 173 are placed on the right side of the protruding area IA on the left. With respect to the light guide plate 175, the second light sources 173 may be described as being placed in a space on the right side of the B area 175b. In the drawing, a first direction L1 corresponds to a vertical direction (upward), and the third direction L3 corresponds to a horizontal direction (leftward).

As illustrated in (b) of FIG. 7, when both the display area and protruding area IA of the smartphone 100 according to the second exemplary embodiment are driven, the first light sources 172 located at the lower end of the smartphone 100 and the second light sources 173 located adjacent to the protruding area IA both emit light. Accordingly, the light emitted from the first light sources 172 travels in the first direction L1 along an area A (display area) 175a of the light guide plate 175, and is transmitted to the upper end from the lower end. The light emitted from the second light sources 173 travels in the third direction L3 along a B area (protruding area) 175b of the light guide plate 175. In contrast, when only the protruding area IA is driven, only the second light sources 173, which are adjacent to the protruding area IA, emit light.

As can be seen from above, the smartphone 100 according to the second exemplary embodiment has lower power consumption compared to the test example, because only the second light sources 173, which are adjacent to the protruding area IA, are required to emit light when displaying information by driving only the protruding area IA.

Third Exemplary Embodiment

As illustrated in (a) of FIG. 8, in the third exemplary embodiment, a protruding area IA is provided on the left and right top sides of the liquid crystal panel, and a smartphone 100 is implemented using the protruding area IA. A left top protruding area IA1 shows base station's reception status, etc., and a right top protruding area IA2 shows battery charging status (or remaining usage time), etc.

An external module area 115 with a camera or illumination sensor is located between the left and right top protruding areas IA1 and IA2. With the presence of the external module area 115, the protruding area IA on the left and right top sides of the liquid crystal panel is separated into the left and right top protruding areas IA1 and IA2, spaced apart from each other. By this, the light guide plate 175 is likewise separated into a left B area 175bL corresponding to the left top protruding area IA1 and a right B area 175bR corresponding to the right top protruding area IA2, spaced apart from each other.

The smartphone 100 according to the third exemplary embodiment, too, shows current time, applications specified by the user, etc. in the display area, and shows base station's reception status, battery charging status, etc. in the protruding area IA. The smartphone 100 according to the third exemplary embodiment is implemented in a way that drives the display area and the protruding area IA to display information or in a way that selectively drives either the display area or the protruding area IA or only one of the left and right top protruding areas IA1 and IA2 to display information.

In order to minimize the usage of light sources on the smartphone 100 according to the third exemplary embodiment, based on the test results obtained from the test example, (2-1)st and (2-2)nd light sources 173 (otherwise referred to as sub LEDs), in addition to the first light sources 172 (otherwise referred to as main LEDs), are placed in the external module area 115, adjacent to the protruding area IA.

That is, the (2-1)st and (2-2)nd light sources 173 are placed between the left top protruding area IA1 and the right top protruding area IA2. With respect to the light guide plate 175, the (2-1)st and (2-2)nd light sources 173 are placed between the left B area 175bL and the right B area 175bR.

Unlike the first light sources 172, the (2-1)st and (2-2)nd light sources 173 comprise the (2-1)st light source 173b that emits light in a second direction L2 and the (2-2)nd light source 173a that emits light in a third direction L3. In the drawing, a first direction L1 corresponds to a vertical direction (upward), the second direction L2 corresponds to a first horizontal direction (rightward), and the third direction L3 corresponds to a second horizontal direction (leftward). Thus, for example, the second direction L2 and the third direction L3 may be antiparallel to each other and may each be perpendicular to the first direction L1. In one embodiment, the second direction L2 is within a predefined tolerance of antiparallel to the third direction L3 such as, for example, within 5 degrees of antiparallel, within 10 degrees, or within 20 degrees. Furthermore, each may be within a predefined tolerance of perpendicular to the first direction L1 such as, for example, within 5 degrees of perpendicular, within 10 degrees, or within 20 degrees.

As illustrated in (b) of FIG. 8, when both the display area and protruding area IA of the smartphone 100 according to the third exemplary embodiment are driven, the first light sources 172 located at the lower end of the smartphone 100 and the (2-1)st and (2-2)nd light sources 173 located adjacent to the protruding area IA both emit light. Accordingly, the light emitted from the first light sources 172 travels in the first direction L1 along an area A (display area) 175a of the light guide plate 175, and is transmitted to the upper end from the lower end. The light emitted from the second light sources 173 travels in the second and third directions L2 and L3 along the B areas (protruding areas) 175bL and 175bR of the light guide plate 175.

In contrast, when only the protruding area IA is driven, only the (2-1)st and (2-2)nd light sources 173, which are adjacent to the protruding area IA, emit light. Also, when only the right protruding area IA2 of the protruding area IA is driven, only the (2-1)st light source 173b emits light, while when only the left protruding area IA1 is driven, only the (2-2)nd light source 173a emits light.

As can be seen from above, the smartphone 100 according to the third exemplary embodiment has lower power consumption compared to the test example, because only the (2-1)st and (2-2)nd light sources 173, which are adjacent to the protruding area IA, are required to emit light when displaying information by driving only the protruding area IA. Moreover, the smartphone 100 according to the third exemplary embodiment has much lower power consumption compared to the test example, because the left and right top protruding areas IA1 and IA2 are selectively driven and therefore only one of the (2-1)st and (2-2)nd light sources 173 is required to emit light.

Fourth Exemplary Embodiment

As illustrated in (a) of FIG. 9, in the fourth exemplary embodiment, a protruding area IA is provided on the right side of the liquid crystal panel, and a smartphone 100 is implemented using the protruding area IA. The right protruding area IA shows base station's reception status, battery charging status (or remaining usage time), short messages, use-specified information, user-specified buttons, etc. Alternatively, the protruding area IA may be provided on the left side of the liquid crystal panel.

An external module area 115 with a camera or illumination sensor is located above the right protruding area IA. With the presence of the external module area 115, the right protruding area IA on the right side of the liquid crystal panel is formed corresponding to the length (y-axis) of the display area except the length of a part at the top. By this, the light guide plate 175 has a main light plate (A area) 175a corresponding to the display area and a sub-display light plate (B area) 175b corresponding to the right protruding area IA. Moreover, the right protruding area IA and the external module area 115 may be implemented in such a way that they emit light, not in the same direction as the display area, but to the sides (i.e., the edges of the smartphone).

The smartphone 100 according to the fourth exemplary embodiment, too, shows current time, applications specified by the user, etc. in the display area, and shows base station's reception status, battery charging status, etc. in the protruding area IA. The smartphone 100 according to the fourth exemplary embodiment is implemented in a way that drives the display area and the protruding area IA to display information or in a way that selectively drives either the display area or the protruding area IA to display information.

In order to minimize the usage of light sources on the smartphone 100 according to the fourth exemplary embodiment, based on the test results obtained from the test example, second light sources 173 (otherwise referred to as sub LEDs), in addition to the first light sources 172 (otherwise referred to as main LEDs), are placed in the external module area 115, adjacent to the protruding area IA.

That is, the second light sources 173 are placed above the right protruding area IA. With respect to the light guide plate 175, the second light sources 173 may be described as being placed in a space above the B area 175b.

Unlike the first light sources 172, the second light sources 173 emit light in a fourth direction L4. That is, the second light sources 173 emit light in the opposite direction (e.g., antiparallel) of the first light sources 172. In the drawing, a first direction L1 corresponds to a first vertical direction (upward), and the fourth direction L4 corresponds to a second vertical direction (downward).

As illustrated in (b) of FIG. 9, when both the display area and protruding area IA of the smartphone 100 according to the fourth exemplary embodiment are driven, the first light sources 172 located at the lower end of the smartphone 100 and the second light sources 173 located adjacent to the protruding area IA both emit light. Accordingly, the light emitted from the first light sources 172 travels in the first direction L1 along the area A (display area) 175a of the light guide plate 175, and is transmitted to the upper end from the lower end. The light emitted from the second light sources 173 travels in the fourth directions L4 along the B area (protruding area) 175b of the light guide plate 175. In contrast, when only the protruding area IA is driven, only the second light sources 173, which are adjacent to the protruding area IA, emit light.

As can be seen from above, the smartphone 100 according to the fourth exemplary embodiment has lower power consumption compared to the test example, because only the second light sources 173, which are adjacent to the protruding area IA, are required to emit light.

However, it was discovered that, although it depends on the configuration and structure of the backlight unit, smartphones manufactured according to the foregoing exemplary embodiments may suffer from luminance non-uniformity due to spreading or overlapping of light, when existing light sources and additional light sources placed in the protruding area emit light individually or together.

The luminance non-uniformity due to spreading or overlapping of light, occurring when only the light sources placed in the protruding area emit light, and a solution to this problem will be explained below. To simplify the explanation, the following description will be made by taking the smartphone of the first exemplary embodiment as an example.

Figure 10:
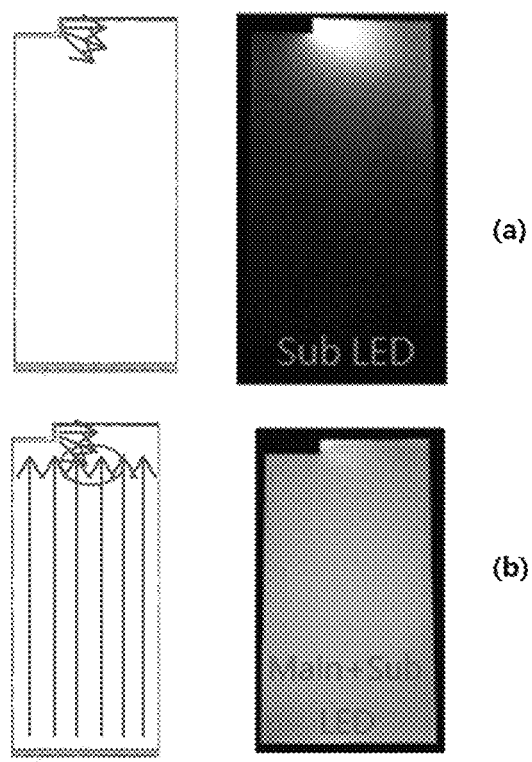
FIG. 10 is a view illustrating luminance non-uniformity due to spreading or overlapping of light, occurring when only the light sources placed in a protruding area emit light.

FIG. 10 is a view illustrating luminance non-uniformity due to spreading or overlapping of light, occurring when only the light sources placed in a protruding area emit light. FIGS. 11 to 15 are views illustrating a solution to the luminance non-uniformity occurring when only the light sources placed in a protruding area emit light.

As explained in the first exemplary embodiment, the main light plate (A area) 175a corresponding to the display area and the sub-display light plate (B area) 175b corresponding to the protruding area are provided on the light guide plate 175. Also, the second light sources are placed in the B area 175b of the light guide plate 175.

For this reason, when only the protruding area of the smartphone 100 is driven, the light entering through the B area 175b of the light guide plate 175 is not confined in the sub-display light plate (B area) 175b of the light guide plate 175, but spreads out to the main light plate (A area) 175a, as shown in (a) of FIG. 10.

This spreading of light occurs because the spread angle of the additional light sources causes light to spread downward and be transmitted to unnecessary areas. This results in low light efficiency, and light cannot reach a target area. Another cause is that the main light plate (A area) 175a and the sub-display light plate (B area) 175b are not separated (split) from each other in terms of structure. That is, the spreading of light is a structural, physical, and optical phenomenon that occurs when additional light sources placed in a particular area work coupled with the light transmission characteristics of the light guide plate 175.

On the other hand, when both the display area and protruding area of the smartphone 100 are driven, the light entering through the main light plate (A area) 175a and the sub-display light plate (B area) 175b of the light guide plate 175 overlaps at the boundary of the main light plate (A area) 175a and sub-display light plate (B area) 175b of the light guide plate 175, as shown in (b) of FIG. 10.

This overlapping of light occurs because the spread angle of the additional light sources causes light to spread downward and be transmitted to unnecessary areas. This results in low light efficiency, and light cannot reach a target area. Another cause is that the main light plate (A area) 175a and the sub-display light plate (B area) 175b are not separated (split) from each other in terms of structure. That is, the overlapping of light is a structural, physical, and optical phenomenon that occurs when additional light sources placed in a particular area work coupled with the light transmission characteristics of the light guide plate 175.

The results of various tests based on the phenomena shown in FIG. 10 showed that the above-described problems can be solved or alleviated by the use of a structure to be described below.

Figure 11:
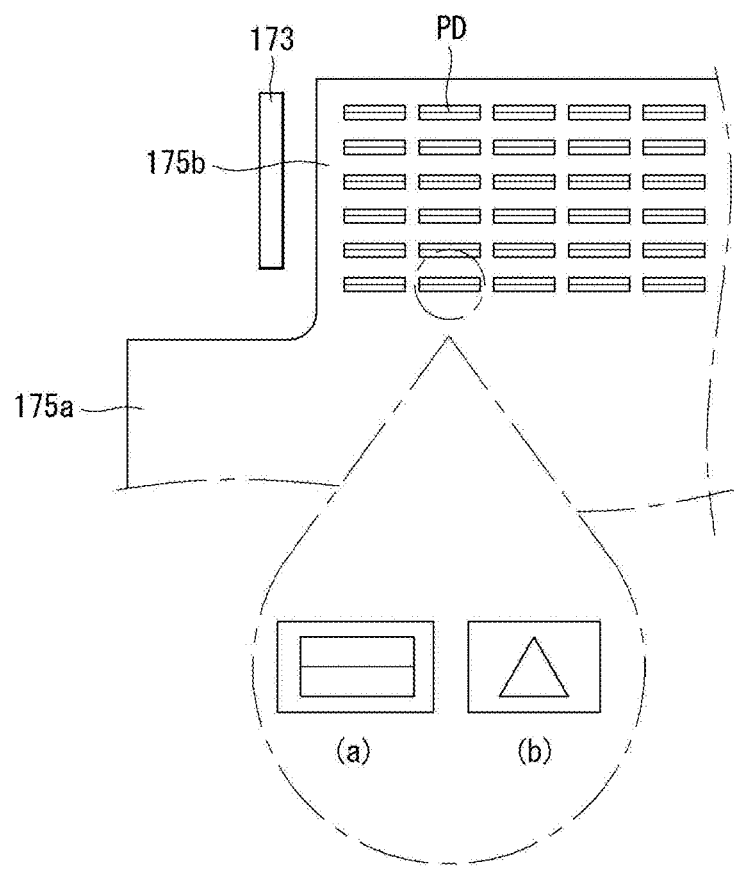

As illustrated in FIG. 11, in an exemplary embodiment of the present invention, a pattern of prism dots PD is formed on the top or bottom surface of the B area 175*b* of the light guide plate, in order to alleviate the above problem. The prism dots PD are patterned in such a way that the vertices (highest points) of prisms of the same size are arranged in the direction of travel of the light emitted from the additional light sources. That is, the prism dots PD are arranged in such a way that the longitudinal direction of the vertices of the prisms corresponds to the direction of travel of light (in other words, the prism pattern is arranged in the direction of travel of light).

The prism dots PD may enhance the linearity of light guided (emitted) to the top of the light guide plate. Thus, even with the spread angle of the light sources, the amount of light spread in the vicinity may be reduced once the emitted light reaches the top of the light guide plate. The shape of the prism dot pattern PD will be depicted with reference to the top plan view shown in (a) of FIG. 11 and the cross-sectional view shown in (b) of FIG. 11.

By forming the prism dot pattern PD on the top or bottom surface of the B area 175*b* of the light guide plate, the problem of light spreading in the vicinity due to the spread angle of the light sources was alleviated, even without the A and B areas 175*a* and 175*b* being separated (split) from each other in terms of structure.

The additional, second light sources and the exiting, first light sources may have different maximum emission brightness. Specifically, the prism dot pattern PD will be more effective especially when the maximum emission brightness of the additional, second light sources is lower than that of the existing, first light sources. For example, if the maximum emission brightness of the existing, first light sources is about 13,000 nit, the maximum emission brightness of the additional, second light sources may be set to about 7,000 nit.

As illustrated in FIGS. 12 and 13, in an exemplary embodiment of the present invention, a pattern of protrusions LP1 and LP2 is formed on the top or bottom surface of the A and B areas 175*a* and 175*b* of the light guide plate, in order to alleviate the above problem. However, the first protrusions LP1 formed in the main light plate (A area) 175*a* of the light guide plate and the second protrusions LP2 formed in the sub-display light plate (B area 175*b*) of the light guide plate differ in at least one of the following: height, width, density, and number. Also, at least one of the height (or depth), width, density, and number of the first and second protrusions LP1 and LP2 changes by gradation under a boundary area overlapping the boundary between the main light plate (A area 175*a*) and the sub-display light plate (B area 175*b*) of the light guide plate.

In an example, the first and second protrusions LP1 and LP2 may be formed in a lenticular shape, as shown in (A) of FIG. 13. Also, the height and width of the first protrusion LP1 in the main light plate (A area) 175*a* of the light guide plate and of the second protrusion LP2 in the sub-display light plate (B area) 175*b* of the light guide plate may be in the relation LP1<LP2.

In another example, the first and second protrusions LP1 and LP2 may be formed in a prism shape, as shown in (B) of FIG. 13. Also, the height and width of the first protrusion LP1 in the main light plate (A area) 175*a* of the light guide plate and of the second protrusion LP2 in the sub-display light plate (B area) 175*b* of the light guide plate may be in the relation LP1<LP2.

Although the above description has been made with respect to the first and second protrusions in the lenticular or prism shape, they may be in a combination of the lenticular and prism shapes. That is, the first and second protrusions may be applied to the light guide plate in various ways, including to the main light plate (A area) only, to the sub-display light plate (B area) only, to both the main light plate (A area) and sub-display light plate (B area), to both the main light plate (A area) and sub-display light plate (B area) and the boundary between them, to the main light plate (A area) and the boundary between the main light plate (A area) and sub-display light plate (B area), etc.

Other embodiments relating to the application of the first and second protrusions to each area and the depth and density thereof are shown in the following Table 1:

| | Main Light Plate (A area) | Sub-Display Light Plate (B area) | Boundary between Main Light Plate (A area) and Sub-Display Light Plate (B area) | Others |
| --- | --- | --- | --- | --- |
| Lenticular & Prism Shapes | Not applied Applied to shallow depth | Applied Applied to large depth | — Gradation applied | Gradation applied to A area and boundary between A and B areas but not to B area |
| | Low pattern density | High pattern density | Gradation not applied | Same as above |

By way of another example, the formation of a structural part on the side (incident plane) of the B area 175*b* of the light guide plate and the use thereof will be described below.

Figure 14:
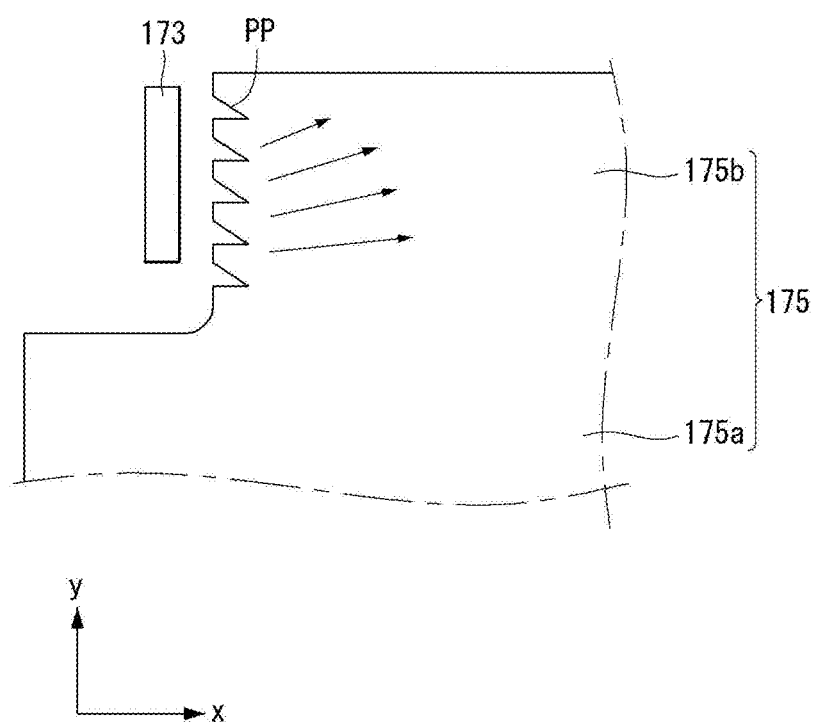

As illustrated in FIG. 14, in an exemplary embodiment of the present invention, a pattern of notches PP is formed on the side (incidence plane) of the B area 175*b* of the light guide plate, in order to alleviate the above-described problem, provided that the notches PP may have serrations so that most of the light emitted from the additional, second light sources spreads out in one direction.

When applied to the structure of the first exemplary embodiment as shown in FIG. 14, the notches PP have upward-slopping serrations (asymmetrical serrations whose left and right sides are different sizes on the incidence plane of the light guide plate lying in a plane) so that light spreads upward of the sub-display light plate (B area) 175*b* of the light guide plate, rather than of the main light plate (A area) 175*a*. Contrariwise, when applied to the structures of the second to fourth exemplary embodiments, the slope of the serrations on the notches PP may be different than that of the upward-sloping serrations.

The notches PP having the serrated appearance direct or guide the light emitted from the additional, second light sources to the structure (e.g., a guide panel covering the liquid crystal panel) located on one side. Thus, the light is reflected off the structure, and this makes it possible to store a certain amount of light or more.

Figure 15:
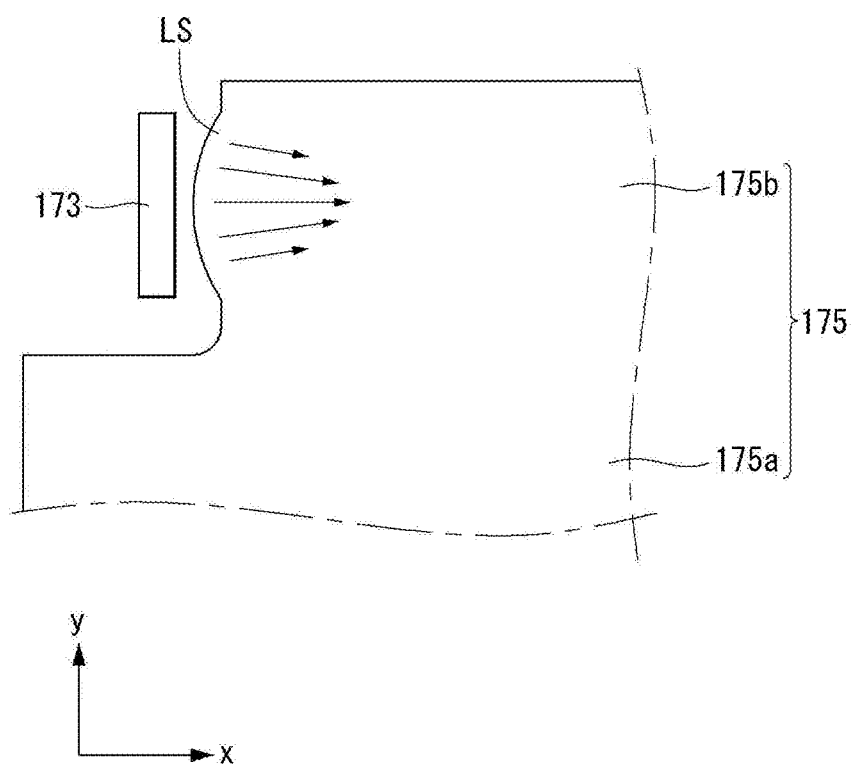

As illustrated in FIG. 15, in an exemplary embodiment of the present invention, a lens part LS is patterned on the side (incidence plane) of the B area of the light guide plate, in order to alleviate the above-described problem. The lens part LS has the shape of a convex lens (which is more convex at the center than at the left and right sides on the incidence plane of the light guide plate lying in a plane) so that most of the light emitted from the additional, second light sources is focused towards the center (middle).

When applied to the structure of the first exemplary embodiment as shown in FIG. 15, the lens part LS has the shape of a convex lens that bulges towards the light sources so that light spreads out towards the center (middle) of the sub-display light plate (B area) 175b of the light guide plate, rather than of the main light plate (A area) 175a. When applied to the structures of the second to fourth exemplary embodiments, the convex lens-like portion of the lens part LS may be formed in a likewise manner, but at a different position. The lens part LS may alleviate problems like overlapping of light by minimizing the spreading of light on the incidence plane.

While the structures explained with reference to FIGS. 11 to 15 have been described with an example in which they are applied individually, these structures may be applied in combination to prevent spreading or overlapping of light. That is, a combination of the structure of FIG. 11 and the structure of FIG. 14, a combination of the structure of FIG. 11 and the structure of FIG. 15, etc. may be applicable.

As discussed above, the present invention offers the advantage of providing a liquid crystal display having at least one sub display area (B area) as well as a main-display area (A area), additionally placing individually-drivable light sources in the sub display area, and driving the sub display area alone.

Moreover, the present invention offers the advantage of displaying images in the main display area and the sub display area, individually or together, because the first and second areas of the light guide plate are integrated with each other (that is, the first and second areas are separated from each other, not physically but functionally).

In addition, the present invention offers the advantage of minimizing the spreading or overlapping of light caused by the light sources placed in the sub display area. Also, the present invention offers the advantage of preventing and alleviating the problem of a visible boundary between the main display area and the sub display area.

Furthermore, the present invention offers the advantage of enhancing the feature of displaying additional information by forming the sub display area, in addition to the main display area. Also, the present invention offers the advantage of widening the display area within the device and reducing the bezel.

The invention claimed is:

1. A liquid crystal display, comprising:
    a liquid crystal panel including a main display area and a first sub-display area protruding from the main display area, the first sub-display area smaller in length and width than the main display area;
    a backlight unit including:
    a light guide plate including a main light plate below the main display area and a first sub-display light plate below the first sub-display area, the light guide plate to guide light to the liquid crystal panel;
    a first light source to emit first light primarily into the main light plate below the main display area; and
    a second light source to emit second light primarily into the first sub-display light plate below the first sub-display area,
    wherein the light guide plate comprises:
    a first plurality of protrusions under the main display area;
    a second plurality of protrusions under the first sub-display area;
    wherein the first plurality of protrusions differ from the second plurality of protrusions in at least one of height, width, density, and number.

2. The liquid crystal display of claim 1, further comprising:
    a light source control circuit to separately control the first light source and the second light source, such that in a first operation mode the second light source is on and the first light source is off, and in a second operation mode both the first and second light sources are on.

3. The liquid crystal display of claim 1, wherein the main display area of the liquid crystal panel comprises a first plurality of rows of pixels each having a same first length, and wherein the first sub-display area of the liquid crystal panel comprises a second plurality of rows of pixels each having a respective length shorter than the first length.

4. The liquid crystal display of claim 1,
    wherein the first light source is configured to emit the first light primarily in a first direction, and
    wherein the second light source is configured to emit second light primarily in a second direction different than the first direction.

5. The liquid crystal display of claim 4, wherein the second direction is substantially perpendicular to the first direction.

6. The liquid crystal display of claim 4, wherein the second direction is substantially anti-parallel to the first direction.

7. The liquid crystal display of claim 4, wherein the liquid crystal panel further comprises a second sub-display area protruding from the main display area, and wherein the light guide plate further comprises a second sub-display light plate below the second sub-display area, the backlight unit further comprising:
    a third light source to emit third light primarily into the second sub-display light plate below the second sub-display area, the third light source to emit the third light primarily in a third direction different than the first direction and the second direction.

8. The liquid crystal display device of claim 1, wherein the light guide plate comprises:
    a pattern of prism dots under the first sub-display area having vertices arranged in a direction of travel of the second light.

9. The liquid crystal display device of claim 1, wherein the first light from the first light source has a greater brightness than the second light from the second light source.

10. The liquid crystal display device of claim 1, wherein the first plurality of protrusions each have a height less than the second plurality of protrusions, and each of the first plurality of protrusions have a width less than the second plurality of protrusions.

11. The liquid crystal display device of claim 1, wherein the light guide plate includes a pattern of notches on a side of the first sub-display light plate adjacent to the second light source.

12. The liquid crystal display device of claim 1, wherein the light guide plate includes a lens part on a side of the first sub-display light plate adjacent to the second light source to focus the second light towards a center line of the first sub-display area.

13. The liquid crystal display device of claim 1, wherein the first sub-display area comprises a long edge and a short edge, and wherein the second light source is positioned adjacent to the short edge.

14. The liquid crystal display device of claim 1, wherein the first sub-display area comprises a long edge and a short edge, the long edge bordering a first portion of an edge of the main display area, the liquid crystal display further comprising:
an external module area having a short edge bordering the short edge of the first sub-display area and a long edge bordering a second portion of the edge of the main display area.

15. The liquid crystal display device of claim 1, wherein the first light and the second light are uniform in color.

16. The liquid crystal display device of claim 1, wherein the first light and the second light are uniform in color.

17. A liquid crystal display, comprising:
a liquid crystal panel including a main display area and a first sub-display area protruding from the main display area, the first sub-display area smaller in length and width than the main display area;
a backlight unit including:
a light guide plate including a main light plate below the main display area and a first sub-display light plate below the first sub-display area, the light guide plate to guide light to the liquid crystal panel;
a first light source to emit first light primarily into the main light plate below the main display area; and
a second light source to emit second light primarily into the first sub-display light plate below the first sub-display area,
wherein the light guide plate further comprises:
a plurality of protrusions on a top surface or a bottom surface of the main light plate and the first sub-display light plate, the plurality of protrusions being different in at least one of height, width, density, and number.

18. A liquid crystal display, comprising:
a liquid crystal panel including a main display area and a first sub-display area protruding from the main display area, the first sub-display area smaller in length and width than the main display area;
a backlight unit including:
a light guide plate including a main light plate below the main display area and a first sub-display light plate below the first sub-display area, the light guide plate to guide light to the liquid crystal panel;
a first light source to emit first light, the first light source disposed in the main display area; and
a second light source to emit second light, the second light source adjacent to the sub-display area,
wherein the light guide plate comprises:
a first plurality of protrusions under the main display area;
a second plurality of protrusions under the sub-display area;
wherein the first plurality of protrusions differ from the second plurality of protrusions in at least one of height, width density, and number.

19. The liquid crystal display of claim 18, wherein the main display area of the liquid crystal panel comprises a first plurality of rows of pixels each having a same first length, and wherein the sub-display area of the liquid crystal panel comprises a second plurality of rows of pixels each having a respective length shorter than the first length.

20. The liquid crystal display device of claim 18, wherein the light guide plate comprises:
a pattern of prism dots under the sub-display area having vertices arranged in a direction of travel of the second light.

21. The liquid crystal display device of claim 18, wherein the first sub-display area comprises a long edge and a short edge, the long edge bordering a first portion of an edge of the main display area, the liquid crystal display further comprising:
an external module area having a short edge bordering the short edge of the first sub-display area and a long edge bordering a second portion of the edge of the main display area.

22. A liquid crystal display, comprising:
a liquid crystal panel including a main display area and a first sub-display area protruding from the main display area, the first sub-display area smaller in length and width than the main display area;
a backlight unit including:
a light guide plate including a main light plate below the main display area and a first sub-display light plate below the first sub-display area, the light guide plate to guide light to the liquid crystal panel;
a first light source to emit first light, the first light source disposed in the main display area; and
a second light source to emit second light, the second light source adjacent to the sub-display area,
wherein the light guide plate further comprises:
a plurality of protrusions on a top surface or a bottom surface of the main display area and the sub-display area, the plurality of protrusions being different in at least one of height, width, density, and number.

\* \* \* \* \*